United States Patent [19]

Ikeda et al.

[11] Patent Number: 5,113,300

[45] Date of Patent: May 12, 1992

[54] THIN FILM MAGNETIC HEAD

[75] Inventors: Yoshito Ikeda; Hiroaki Narisawa; Noboru Wakabayashi, all of Miyagi, Japan

[73] Assignee: Sony Corporation, Tokyo, Japan

[21] Appl. No.: 752,220

[22] Filed: Aug. 21, 1991

Related U.S. Application Data

[63] Continuation of Ser. No. 590,035, Oct. 1, 1990, abandoned, which is a continuation of Ser. No. 913,495, Sep. 30, 1986, abandoned.

[30] Foreign Application Priority Data

Oct. 1, 1985 [JP] Japan .................. 60-218734
Oct. 1, 1985 [JP] Japan .................. 60-218735

[51] Int. Cl.$^5$ .................................. G11B 5/147
[52] U.S. Cl. ................................ 360/126; 360/123
[58] Field of Search .................... 360/126, 122–123, 360/125, 110, 103

[56] References Cited

U.S. PATENT DOCUMENTS

| | | | |
|---|---|---|---|
| 4,190,872 | 2/1980 | Jones, Jr. et al. | 360/125 |
| 4,281,357 | 7/1981 | Lee | 360/125 |
| 4,375,657 | 3/1983 | Brock et al. | 360/125 |
| 4,402,801 | 9/1983 | Omata et al. | 204/15 |
| 4,490,760 | 12/1984 | Kaminaka et al. | 360/126 |
| 4,636,901 | 1/1987 | Ohura et al. | 360/126 |
| 4,639,289 | 1/1987 | Lazzari | 360/125 |
| 4,652,957 | 3/1987 | Schewe et al. | 360/126 |

FOREIGN PATENT DOCUMENTS 58-212616 12/1983 Japan ................. 360/125

OTHER PUBLICATIONS

Japanese 60113312, Jun. 1985, Handa.
The Patent Abstract of Japan vol. 8, No. 183 (P-296) (1620) Aug. 23, 1984, 59-75421 Saitou et al.

Primary Examiner—John H. Wolff
Attorney, Agent, or Firm—Hill, Van Santen, Steadman & Simpson

[57] ABSTRACT

A thin film magnetic head which includes a substrate of magnetic or nonmagnetic material, an upper magnetic film on the substrate, a coil conductor on the substrate, and a lower magnetic film on the substrate, the lower magnetic film having a groove formed therein for receiving the coil conductor therein. In the preferred form of the present invention, the thickness of the lower magnetic film is at least 0.3 times the thickness of the upper magnetic film when the substrate is composed of a magnetic material and at least 0.8 times the thickness of the upper magnetic film when the substrate is composed of a nonmagnetic material.

1 Claim, 3 Drawing Sheets

THIN FILM MAGNETIC HEAD

This is a continuation of application Ser. No. 590,035, filed Oct. 1, 1990 which is a continuation of Ser. No. 913,495 filed Sept. 30, 1986, now both abandoned.

BACKGROUND OF THE INVENTION

1. Field of the Invention

The present invention relates to a thin film magnetic head useful for PCM (pulse code modulation) recording and reproducing devices. More particularly, it relates to the construction of the lower magnetic film which forms a portion of the magnetic head structure.

2. Description of the Prior Art

A thin film magnetic head is generally considered to be superior in terms of mass production capability and also in its uniformity of magnetic properties since the coil conductors, the upper magnetic film and the insulating film that make up the magnetic circuit are formed by commercially available techniques such as sputtering. In addition, the miniaturization in size, particularly the reduction in the track and gap widths is facilitated in thin film magnetic heads since the patterning may be achieved by conventional photolithographic techniques.

The thin film magnetic head is also improved magnetically because the recording magnetic field in the head which takes part in the recording can be made quite intense to permit high density as well as high resolution recording. At the same time, the recording and reproducing device is reduced in size.

In general, in this type of thin film magnetic head of the prior art as shown in FIG. 5, there is a lower magnetic film 52 composed of a ferromagnetic material such as "Sendust" (an Fe-Al-Si alloy) located in superposition on a nonmagnetic substrate 51 formed, for example, of a ceramic material. With this type of structure, good magnetic recording and reproduction can be achieved even on a magnetic recording medium having a high coercive force while achieving high density recording and reproduction. Several turns of a lower coil conductor 54 are applied in a flat spiral over the lower magnetic film 52 and are separated therefrom by means of a first insulating film 53. Several turns of an upper coil conductor 56 are wound in a similar manner on the lower coil conductor 54 with the interposition of a second insulating film 55. In the embodiment shown, four turns of the lower coil conductor 54 and three turns of the upper coil conductor 56 are applied in the manner described above. In addition, the lower and upper coil conductors 54 and 56 are electrically connected to each other through a contact window 57. On top of the upper coil conductor 56, an upper magnetic film 59 formed, for example, of "Sendust" is provided with an intermediate third insulating film 58 to provide a predetermined track width. Hence, a closed magnetic loop is formed by the lower magnetic film 52 and the upper magnetic film 59 to permit magnetic recording and reproduction.

In the thin film magnetic head described above, there is a step-like difference in level necessarily formed in the upper magnetic film 59 due to the film thicknesses of the coil conductors 54 and 56. The thickness of the upper magnetic film 59a tends to be reduced on those stepped portions as compared to that on the flat portion. For this reason, magnetic saturation is likely to be achieved in the upper magnetic film during recording. Therefore, there is a problem arising in that it is difficult to produce a large recording magnetic field.

In order to prevent magnetic saturation of the upper magnetic film from occurring, it has been suggested to eliminate the step-like level difference to provide a substantially flat upper magnetic film 68 as shown in FIG. 6. Thus, there is provided a groove 69 for winding the coil conductors 63 and 65 therein, the groove being located on a lower magnetic film 66 on a magnetic substrate formed, for example, of a magnetic material such as a ferrite. In this groove 69 there are wound a lower coil conductor 63 and an upper coil conductor 65 utilizing intermediate insulating layers 62 and 64. The upper magnetic layer 68 is used in conjunction with an intermediate insulating layer 67 to provide for a predetermined track width.

The coil conductors 63 and 65 responsible for the step-like level difference in the upper magnetic film are wound within the groove 69 with the result that the upper magnetic film 68 becomes approximately flat to provide a construction with a uniform film thickness.

However, in the thin film magnetic head shown in FIG. 6, the lower magnetic film 66 tends to undergo magnetic saturation during signal recording with a resulting limitation on the recording magnetic field strength due to the splitting of the lower magnetic film 66 despite the fact that the substrate 61 is formed of a ferrite or similar magnetic material.

In the conventional thin film magnetic head, the lower or upper magnetic film is likely to undergo magnetic saturation during signal recording so that the recording field strength is drastically limited and good recording and/or reproducing properties are not obtained.

SUMMARY OF THE INVENTION

The present invention provides a thin film magnetic head which reduces the possibility of magnetic saturation in the lower and upper magnetic films at the time of recording the information signals.

The recording head of the present invention also provides an improved recording field strength so that the head has excellent recording and reproducing characteristics.

The present invention provides a thin film magnetic head on a substrate including a lower magnetic film, coil conductors, and an upper magnetic film which are arranged in layers with the use of intermediate insulating films. A groove for winding the coil conductors therein is formed in the lower magnetic film and when the substrate is formed of a nonmagnetic material, the groove is dimensioned so that the film thickness of the lower magnetic film is equal to or greater than 0.8 times the thickness of the upper magnetic film. When the substrate is formed of a magnetic material, the groove is proportioned such that the film thickness of the lower magnetic film is equal to or greater than 0.3 times the thickness of the upper magnetic film in the groove.

In this way, since the coil conductors are wound in the groove formed in the lower magnetic film, the upper magnetic film becomes substantially flat so that the upper magnetic film does not undergo magnetic saturation except in the region of its depth. In addition, since the lower magnetic film in the groove has a film thickness as defined above, the lower magnetic film also does not undergo magnetic saturation.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
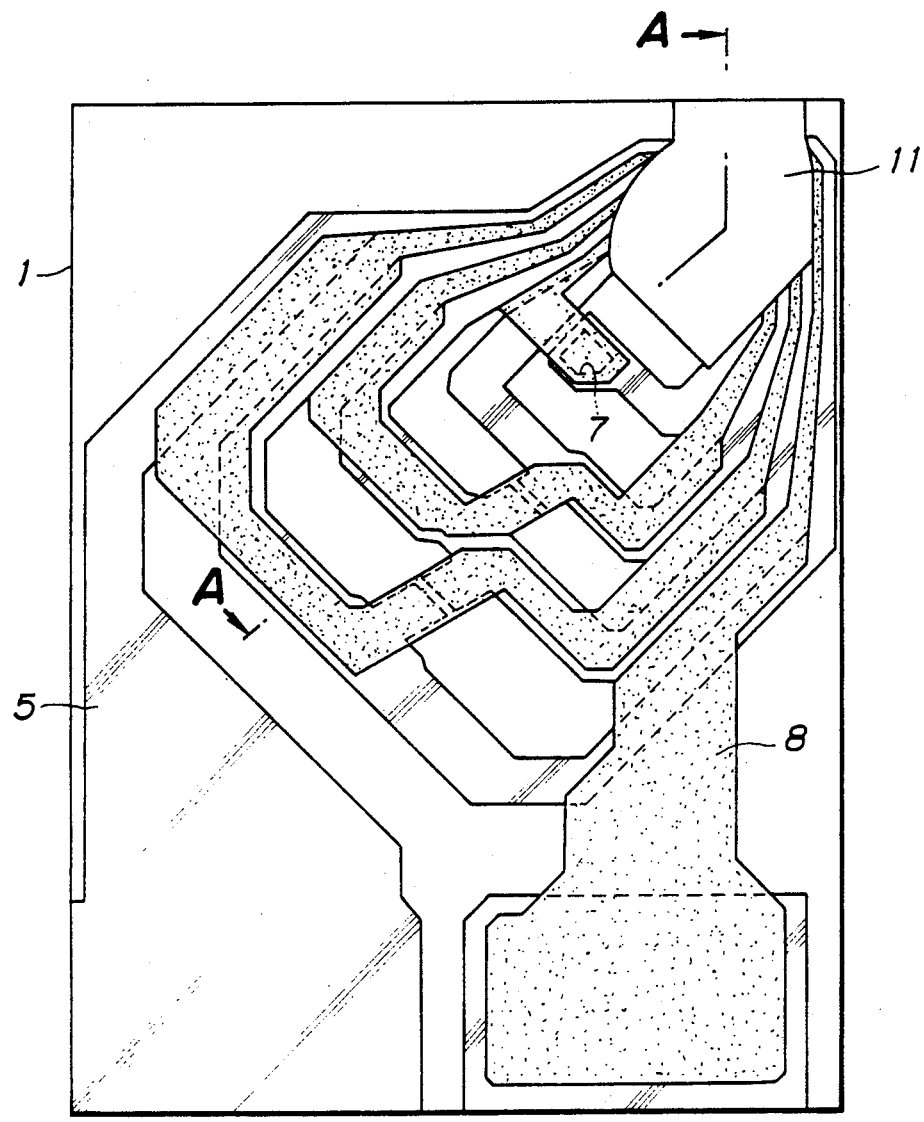
FIG. 1 is a plan view showing the essential parts of a thin film magnetic head according to the present invention.
Figure 2:
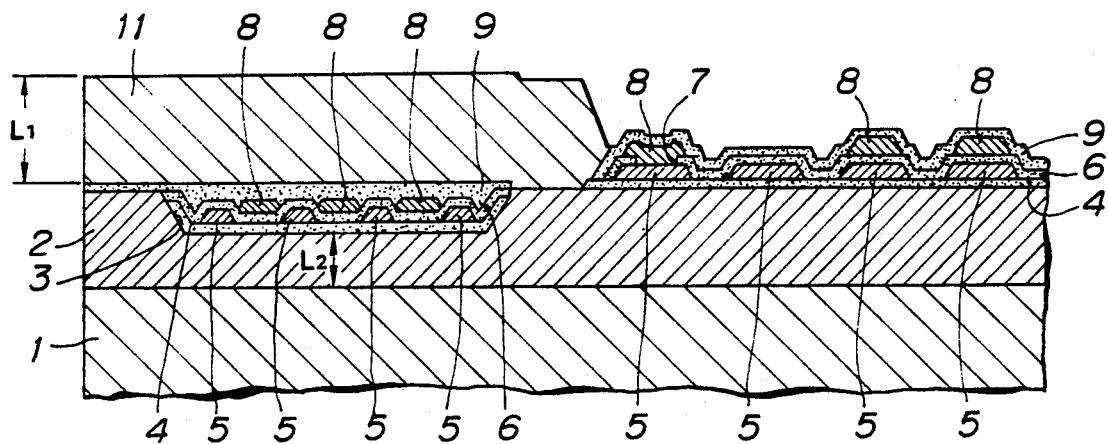
FIG. 2 is a cross-sectional view taken substantially along the line A—A of FIG. 1.

In a thin film magnetic head of the present invention as shown in FIGS. 1 and 2, there is provided a lower magnetic film 2, a lower coil conductor 5, an upper coil conductor 8, and an upper magnetic film 11 in that order on one side of the substrate 1, using intermediate insulating films 4, 6 and 9, respectively.

On the lower magnetic film 2 there is formed a groove 3 by a machining operation for eliminating the step-like level difference that may be caused by the coil conductors 5, 8, being wound on the lower magnetic film 2. According to the present invention, that portion of the lower magnetic film 2 where the groove is formed has a film thickness related to the film thickness of the upper magnetic film 11. It is to be noted that the film thickness of the upper magnetic film is adjusted to different levels, depending on the type of substrate, i.e., whether the substrate is a nonmagnetic material or a magnetic substrate, in addition to the film thickness of the lower magnetic film.

When using a nonmagnetic substrate, the film thickness of the lower magnetic film is such that it equals or exceeds 0.8 times the thickness of the upper magnetic film. When using a magnetic substrate, the film thickness of the lower magnetic film is adjusted to be at least 0.3 times the thickness of the upper magnetic film.

The nonmagnetic substrate may be formed of a nonmagnetic material such as $Al_2O_3$-TiC, $BaO$-$TiO_2$, $Li_2O$-$SiO_2$, MnO-NiO, $CaO$-$TiO_2$, or a glass type ceramic.

The magnetic substrate 1 may be formed of a ferromagnetic oxide such as an Mn-Zn ferrite or an Ni-Zn ferrite. The materials of the lower magnetic film 2 and the upper magnetic film 11 include ferromagnetic metal materials such as Fe-Ni alloys (Permalloy), Fe-Al-Si alloys (Sendust) or an amorphous alloy.

According to experiments conducted by the present inventors, the relationship between the film thicknesses has been found to be of importance and by proper control of the relative film thicknesses, the problems caused by magnetic saturation can be reduced, with an improvement in the magnetic efficiency.

Figure 3:
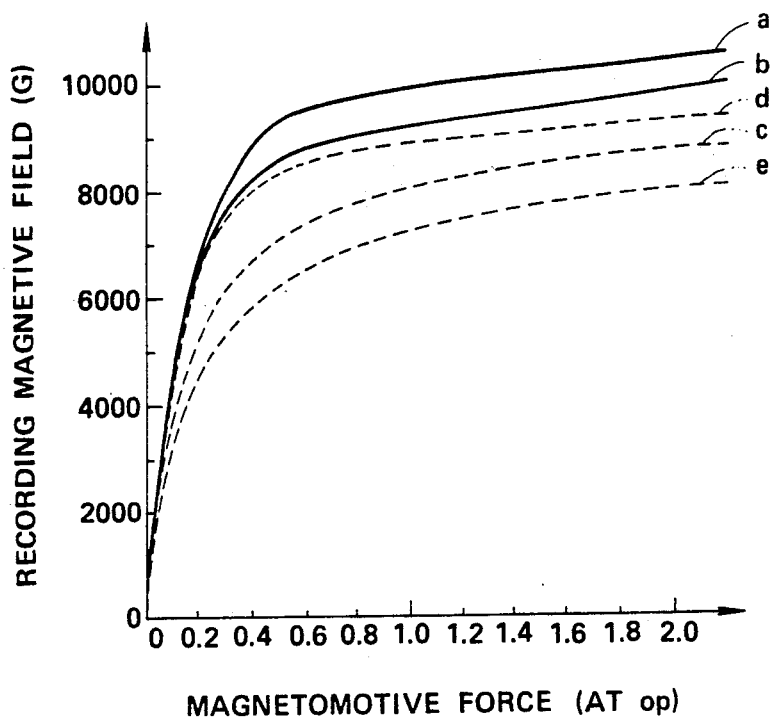
FIG. 3 is a diagram showing the relationship between magnetomotive force and recording magnetive field in thin film magnetic heads which use nonmagnetic substrates.

A thin film magnetic head was prepared using a ceramic nonmagnetic substrate material and "Sendust" as the material for the lower magnetic film 2 and the upper magnetic film 11, the film thickness $L_1$ of the upper magnetic film 11 being about 10 microns and the film thickness $L_2$ of the lower magnetic film in the groove 3 being 10, 8 or 5 microns. The magnetomotive force dependency of the recording magnetic field was determined. The result is shown in FIG. 3 by a curve a (for $L_2=10$ microns), a curve b (for $L_2=8$ microns) or a curve c (for $L_2=5$ microns). In FIG. 3 the unit of AT op represents Ampere Turn zero to peak.

Figure 5:
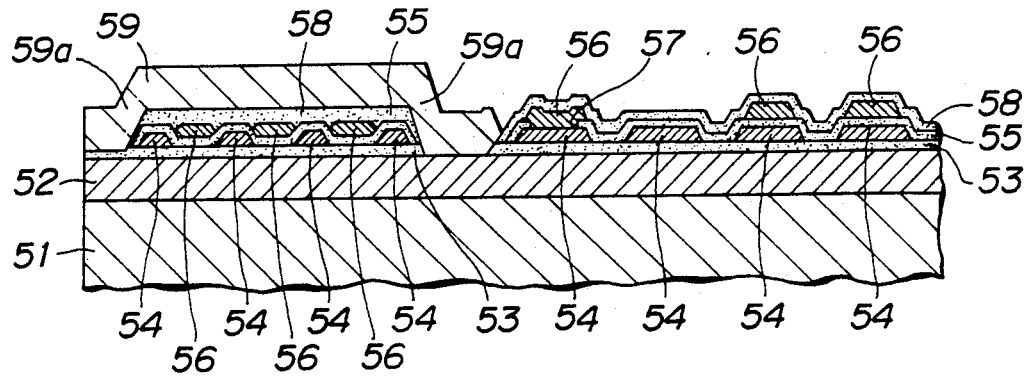
FIG. 5 is a cross-sectional view showing the essential parts of a conventional thin film magnetic head; an FIG. 6 is a cross-sectional view showing essential parts of another type of conventional thin film magnetic head.
Figure 6:
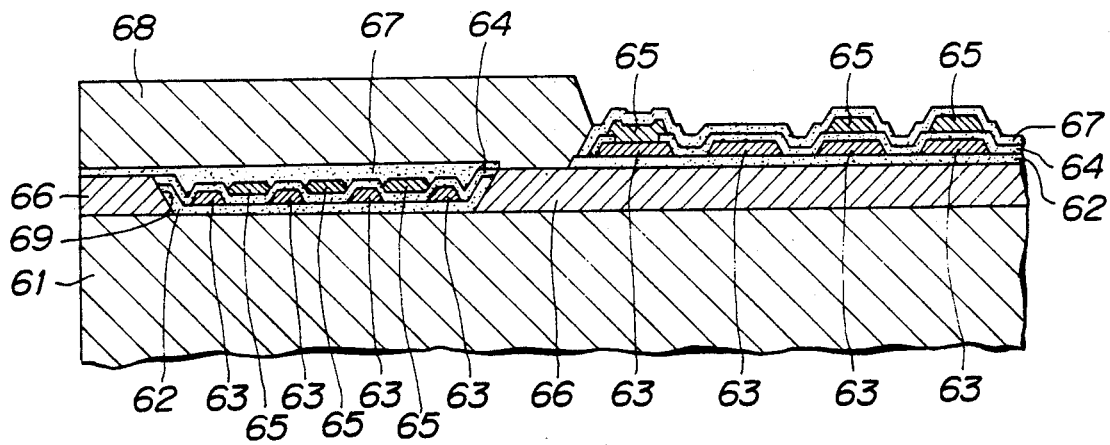

For the sake of comparison, a thin film magnetic head as shown in FIG. 5 was produced with a lower magnetic film 52 of "Sendust" measuring 10 microns thick and an upper magnetic film 59 of "Sendust" measuring 10 microns thick on a ceramic substrate 51 and the magnetomotive force dependency of the recording magnetic field was investigated. The results were as indicated by a curve d in FIG. 3. A thin film magnetic head as shown in FIG. 6 having a lower magnetic film 66 of "Sendust" of 5 microns thickness and an upper magnetic film 68 of "Sendust" of 10 microns thickness on a magnetic substrate 61 of Mn-Zn ferrite was prepared and the magnetomotive force dependency of the recording magnetic field thereof was determined. The results are shown by curve e in FIG. 3.

It will be seen from FIG. 3 that, in the case of using a nonmagnetic substrate, a larger recording field strength can be realized at a lower magnetomotive force than in the case of the conventional magnetic head, on condition that the film thickness $L_2$ of the lower magnetic film 2 in the groove 3 is adjusted so as to be not lower than 0.8 times the film thickness $L_1$ of the upper magnetic film 11.

Figure 4:
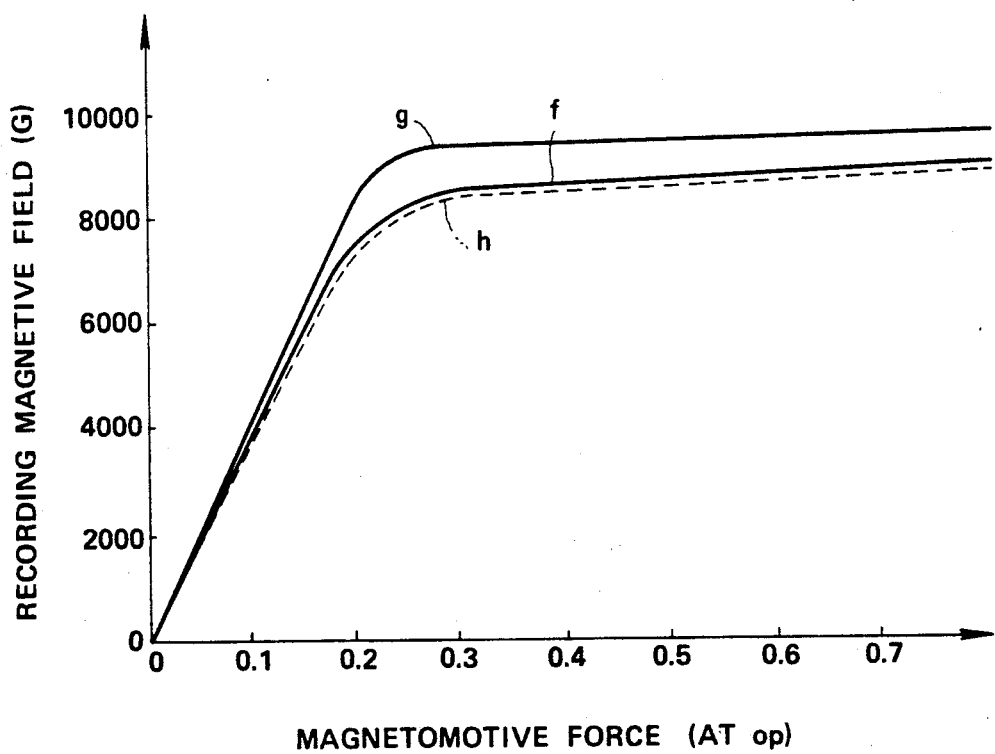
FIG. 4 is a diagram similar to FIG. 3 obtained when using thin film magnetic heads using magnetic substrates.

Another thin film magnetic head was produced using an Mn-Zn ferrite as the magnetic substrate material and "Sendust" alloy as the upper and lower magnetic film materials. The film thickness $L_1$ of the upper magnetic film 11 was 10 microns and the film thickness $L_2$ of the lower magnetic film 2 in the groove 3 was 3 or 5 microns. The magnetic head thus produced had a magnetomotive force dependency of recording magnetic field (the magnetic field in the gap) as shown by curves f and g in FIG. 4 for $L_2=3$ microns and $L_2=5$ microns, respectively. In FIG. 4 the unit of AT op represents Ampere Turn zero to peak.

For the sake of comparison, a thin film magnetic head as shown in FIG. 4 was prepared with a film thickness of the upper magnetic film 58 of Mn-Zn ferrite of 10 microns, and that of the lower magnetic film 52 of "Sendust" of 5 microns. The magnetic head thus produced had a magnetomotive force dependency of the recording magnetic field as shown by curve h in FIG. 4.

It can be seen from FIG. 4 that in the case of a magnetic substrate, a larger recording field strength for a low magnetomotive force can be obtained by using a film thickness $L_2$ of the lower magnetic film 2 in the groove 3 not lower than 0.3 times the thickness $L_1$ of the upper magnetic film 11.

Within the thus described groove 3, there is formed a first insulating film 4 composed, for example, of $SiO_2$. On top of this insulating film 4 a lower coil conductor 5 of a metallic conducting material such as Al or Cu can be formed by pattern etching into a flat spiral with a predetermined distance between the adjacent turns. On top of the lower coil conductor 5 there is deposited a second insulating layer 6 to cover the conductor 5. An upper coil conductor 8 in the form of a flat spiral having the same winding direction as the lower coil conductor 5 is formed and electrically connected with a contact window 7 opening in the second insulating layer 6. In the embodiment shown, four and three turns of the lower and upper coil conductors are provided, respectively. In other words, the coil conductors of the present embodiment are arranged in a flat spiral of a 2-layered, 7-turn winding configuration. On top of the upper coil conductor 8 there is formed a third insulating layer 9 so as to fill the groove 3 while providing for insulation from an upper magnetic film as will be later described.

Although the coil conductors shown are arranged in flat spiral or in convolutions any other winding pattern such as a zigzag or multiply helical pattern may be adopted for the purposes of the present invention.

The upper magnetic film 11 of a ferromagnetic material such as "Sendust" or "Permalloy" is deposited to a predetermined track width so as to cover the front and back gap sections and the groove 3.

When the coil conductors 5, 8 and an external terminal, not shown, are connected to one another and an energizing current is supplied to the coil conductors 5, 8, magnetic fluxes are produced in a magnetic path consisting of the lower magnetic film 2 and the upper magnetic film 11 in such a way that magnetic recording is performed on the magnetic recording medium by leakage fluxes in the front gap section.

In the groove 3, the turns of the upper coil conductor 8 are placed between the adjacent turns of a lower coil conductor 5 in the groove 3 so as to fill the gap therebetween and the third insulating film 9 on these coil conductors 5, 8, will be substantially flat. As a result, the upper magnetic film 11 also becomes substantially flat. In this way, the step-like level difference in the upper magnetic film 11 is eliminated to provide a flat film of a uniform thickness resulting in reducing the possibility of magnetic saturation in the upper magnetic film 11 which might otherwise be caused during recording as well as increasing the recording field strength. The result is an improved recording efficiency, a low magnetomotive force, and improved recording and reproducing efficiency.

In forming the upper magnetic film 11, the overall surface of the substrate is coated with the ferromagnetic metal material which is then subjected to patterning to a predetermined shape by physical processes such as ion etching. Since the upper magnetic film 11 is flat, patterning fluctuations in the upper magnetic film 11 are minimized thus making it possible to provide a thin film magnetic head superior in magnetic properties.

In addition, in the thin film magnetic head of the present invention, magnetic saturation is less likely to occur in the lower magnetic film 2 and the upper magnetic film 11 so the recording field strength can be adjusted to a larger value and the desired recording field strength is assured even with increased depth length. Therefore, by selecting a longer depth length, the wear caused to the magnetic head is minimized with improved durability and service life of the magnetic head.

It is to be noted that the above described embodiments are merely illustrative and that various modifications can be made within the scope of the present invention.

We claim as our invention:

1. A thin film magnetic head comprising: a substrate of magnetic material, a lower magnetic film physically contacting said substrate, said lower magnetic film having a groove formed therein, a coil conductor disposed within the confines of said groove, the top surface of said coil conductor lying below the top surface of said lower magnetic film, the top surface of said lower magnetic film being flat, said lower magnetic film being made of the same material from the bottom of said lower magnetic film to the top surface of said lower magnetic film, an upper magnetic film overlying said lower magnetic film, the thickness of said lower magnetic film measured at the base of said groove being at least 0.3 times the thickness of said upper magnetic film when said substrate is composed of a magnetic material and being at least 0.8 times the thickness of said upper magnetic material film when said substrate is composed of a nonmagnetic material.

* * * * *